UNITED STATES PATENT OFFICE.

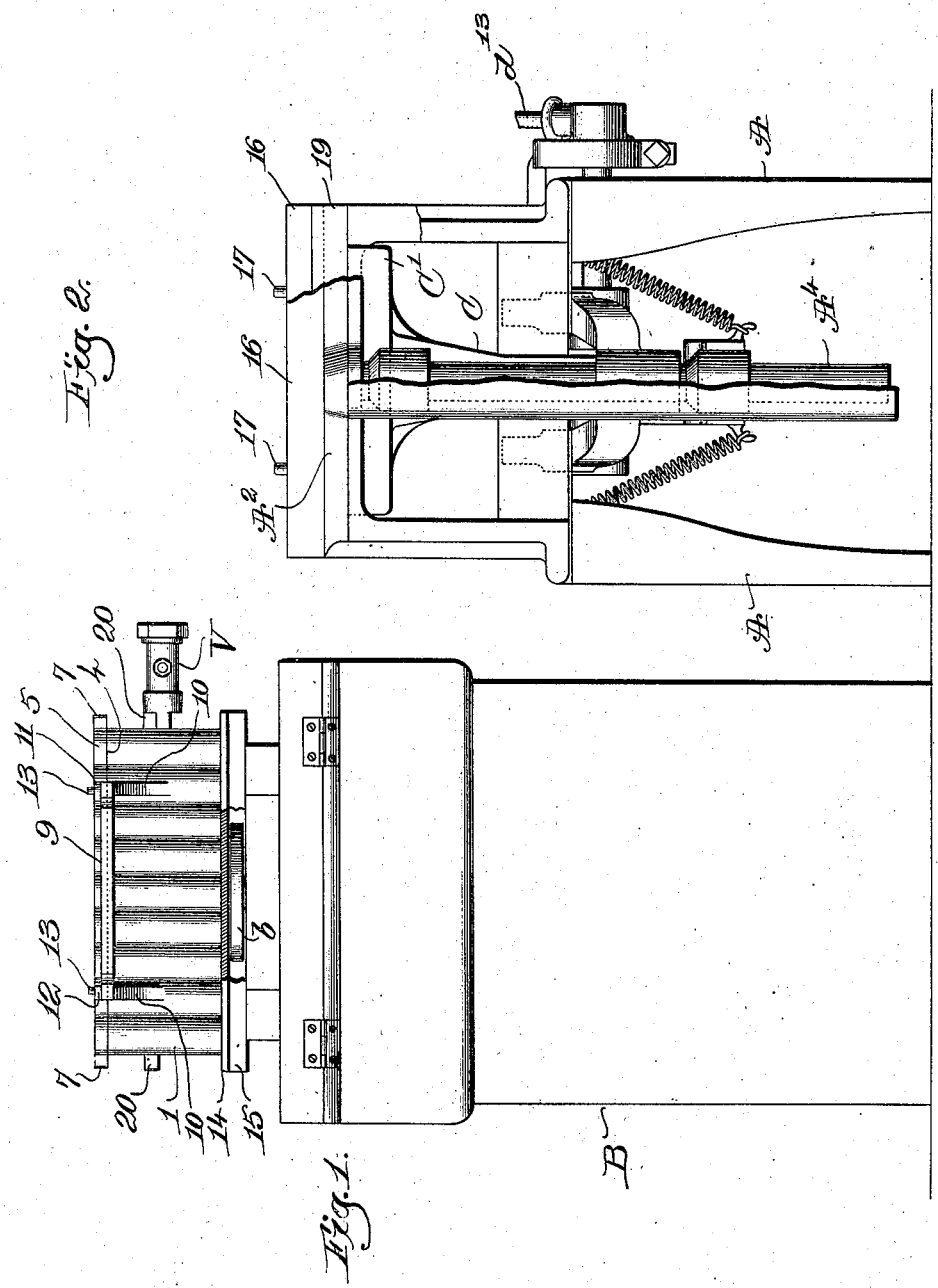

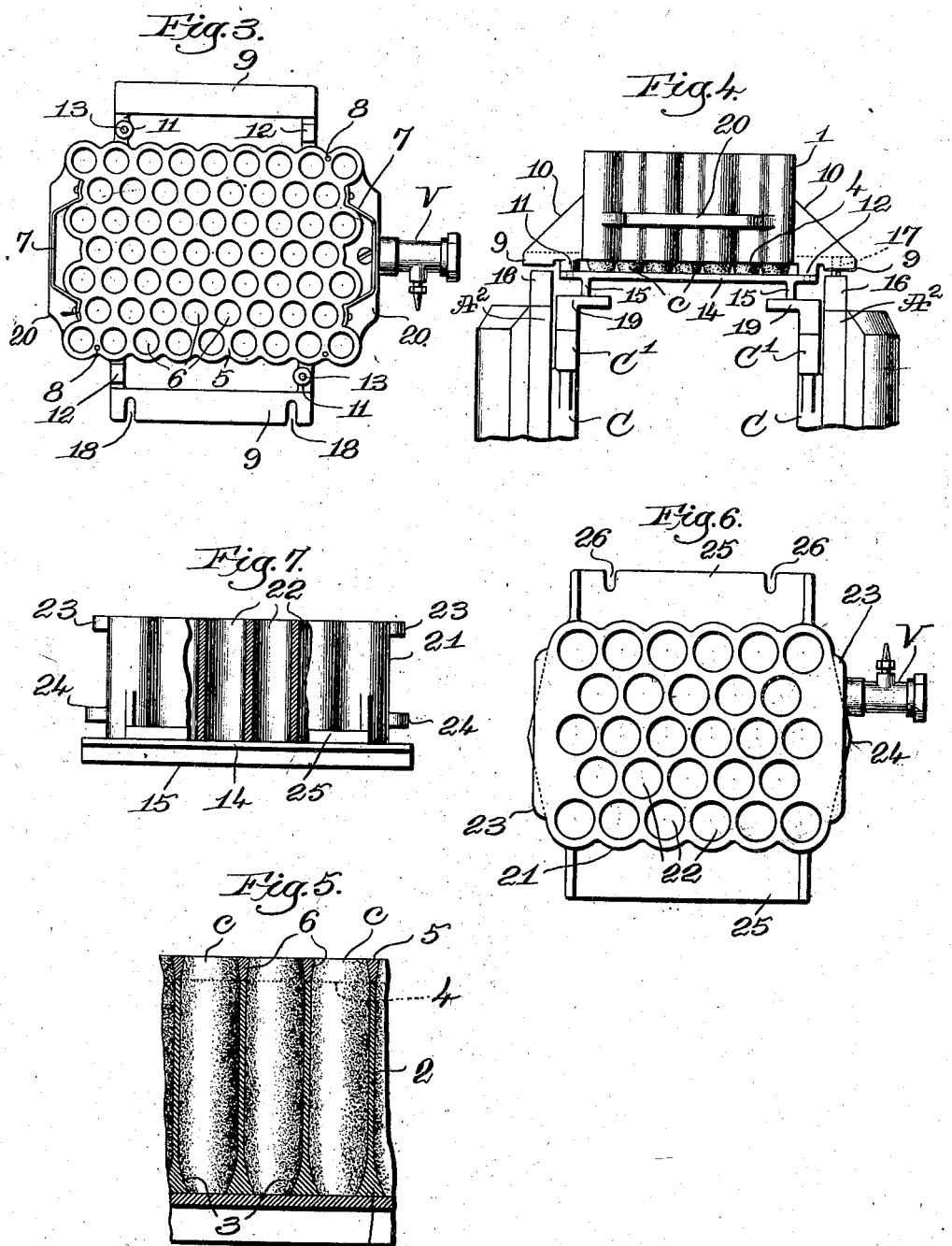

HOWARD W. BRACKEN, OF HOPEDALE, MASSACHUSETTS, ASSIGNOR TO DRAPER COMPANY, OF HOPEDALE, MASSACHUSETTS, A CORPORATION OF MAINE.

CORE-MOLDING APPARATUS.

No. 900,054.  Specification of Letters Patent.  Patented Sept. 29, 1908.

Application filed January 20, 1908. Serial No. 411,581.

*To all whom it may concern:*

Be it known that I, HOWARD W. BRACKEN, a citizen of the United States, and resident of Hopedale, county of Worcester, State of Massachusetts, have invented an Improvement in Core-Molding Apparatus, of which the following description, in connection with the accompanying drawing, is a specification, like letters on the drawing representing like parts.

This invention has for its object the production of apparatus for making simultaneously a series of cores for use in metal founding, the construction and arrangement being such that the cores, when molded, can be removed or stripped from the core-box or molding device with ease and rapidity, all of the cores being removed at once.

By means of this invention I obviate handling of the cores unnecessarily besides greatly facilitating the making of the same.

The various novel features of my invention will be fully described in the subjoined specification and particularly pointed out in the following claims.

Figure 1 is a side elevation of core-molding apparatus embodying one form of my invention, set up in readiness for the molding of the cores; Fig. 2 is an elevation, partly broken out, of a suitable form of machine for removing or stripping the cores when made; Fig. 3 is a top plan view of the core-molding box shown in Fig. 1; Fig. 4 is an end elevation of the core-box, reversed and set in the machine shown in Fig. 2, in readiness to strip the cores from the box. Fig. 5 is an enlarged vertical sectional detail through a portion of the core-molding box, showing the top-plate in place and several cores in the molds; Fig. 6 is a top plan view; and Fig. 7 a side elevation, partly in section, of a modified form of core-box, to be referred to.

I will first describe the apparatus for molding double-taper cores in accordance with my invention, the cores to be made having elongated bodies of the same cross-section throughout, and tapered at each end. A two-part mold is required for such cores, and in the present embodiment of my invention it comprehends a core-box proper, shown at 1, preferably made of cast iron, having formed in it a group or series of open-ended core-molds each having an elongated body 2 and a tapered end 3, Fig. 5, the bodies being in this instance cylindrical. The larger ends of the bodies are flush with the top face 4 of the core-box, and upon this face is laid the second member of the mold, consisting of a top-plate 5 having a series of tapered openings 6, the openings being undercut so that when the top-plate is applied to the box 1 the said openings will register with the upper ends of the mold bodies 2, as shown in Fig. 5. It will be understood that the axes of the molds in the core-box 1 are parallel to each other, and at right angles to the top and bottom faces of the box, and the centers of the tapered holes 6 register with such axes. The top-plate has handles 7 by which it may be moved about, and its thickness depends upon the length of the tapered ends of the cores. Positioning pins 8, Fig. 3, formed on the core-box, enter holes in the top-plate, to accurately fix the latter in place.

Laterally extended supports or wings 9 are formed integral with the box 1 on opposite sides, near its top face, the wings being strengthened by webs 10, the supporting faces of the wings being in a plane slightly higher than the top face 4 of the box, as shown in Fig. 1. Each wing has formed upon it two stops 11, 12, near the corners of the box but outside the top-plate area, as shown in Fig. 3, the faces of the supports being in a plane parallel to the top face of the box and at a distance therefrom equal to the thickness of the top-plate, for a purpose to be described. One stop, as 11, of each pair, has an upstanding lug or pin 13, which is of use after the top-plate is removed, as will be explained.

The top-plate is positioned on the top of the core-box, and the latter is placed upon a bottom-board 14, Fig. 1, having longitudinal ribs 15 on its under side, the board being placed on the top of a shaking or jigging machine B, Fig. 1, forming no part of this invention, the machine having a vertically reciprocated vibrating plunger $b$, actuated by any suitable motive power. The plunger strikes the under side of the bottom-board with a series of rapid, quick taps, and the molding sand shoveled onto the top-plate by the molder is shaken down into the molds and compacted by the vibrations imparted to the core-box through the bottom-board. No pounding or compression of the sand is necessary with this shaking machine, as the damp sand compacts quickly and firmly so that the cores will retain their shape when drawn or stripped from the molding device.

When the molds are filled the surplus sand is scraped off, the molder lifts up and removes the top-plate 5, leaving the tapered ends $c$ of the cores exposed above the top of the core-box 1. The core-box is now lifted from the bottom-board 14, and the latter is placed upon the top of the box, the pins 13 entering holes made in the board, whereupon the board and core-box are reversed, see Fig. 4, the projecting ends of the cores resting upon the bottom-board, but the entire weight of the core-box is sustained by the stops 11 and 12, the flat faces thereof resting squarely upon the bottom-board, any tendency to crush the exposed ends $c$ of the cores being thus absolutely obviated. The bottom-board with the filled core-box is now taken to a molding machine of suitable character, such as shown in United States Patent No. 714285, granted November 25, 1902 to Day and Anderson, a machine of this character being shown in Fig. 2 and partly in Fig. 4. The ends A of the rigid frame support parallel heads $A^2$, between which is located a vertically-movable carrier having connected upright arms C provided with T-shaped heads C', the carrier sliding on vertical guides $A^4$, Fig. 2. Herein I have built up the heads $A^2$ by bars 16, one of them having upturned pins 17, to coöperate with notches 18, Fig. 3, in one of the wings 9. The carrier-heads C' have substantially L-shaped members 19 attached thereto, their lateral portions being inturned as shown in Fig. 4, and at a lower level than the tops of the bars 16 when the carrier is elevated to its full height. When the reversed core-box and bottom-board are placed on this machine the ribs 15 of the board rest upon the members 19 while the wings 9 are just above the tops of the bars 16, the pins 17 in the slots 18 properly positioning the core-box in the machine. The operator now turns the handle $d^{13}$ to lower the carrier and by so doing the wings of the core-box descend and rest on the bars 16, while the bottom-board 14 moves down with the carrier, drawing or stripping the group of cores from the box 1, as will be manifest.

Ordinarily the cores will leave the box cleanly and easily without assistance, but should it be advisable to tap the core-box a vibrator V, Figs. 1 and 3, of well-known construction can be attached to a flange or rib 20 on the core-box, provided for that purpose.

The cores having been withdrawn from the core-box the latter is lifted off and the carrier is elevated, so that the molder can take away the bottom-board with the group of cores standing thereon, obviating any handling of the cores during the entire operation.

If cores having one end tapered are to be made the top-plate 5 is omitted in molding the cores, and the operations previously described are carried out, except that a filling board would have to be placed on the bottom-board, the thickness of the filling board being equal to the depth of the stops 11 and 12, as will be manifest.

Sometimes the cores are of the same cross-section from end to end, and in such case a core-box such as shown in Figs. 6 and 7 is used, the box 21 having a series of open-ended core-molds 22 made therein, the box being seated on the bottom-board 14 during the molding of the cores. Ribs 23 are formed on the box at its ends to serve as handles, and vibrator-attaching ledges 24 are also provided nearer the bottom of the box, to support a vibrator V, Fig. 6. The box is also provided with laterally-extended wings 25, on its opposite sides adjacent its bottom, one of said wings being notched, as at 26. When the cores are molded the box and bottom-board are transferred to the machine shown in Fig. 2, or a similar machine, the wings resting on the bars 16 and the ribs 15 of the bottom-board are supported on the members 19 on the carrier-heads. The pins 17 coöperate with the notches 26 to position the core-box. By lowering the carrier as before the bottom-board descends and the cores move with it, being drawn out of the core-box while the latter is held stationary.

The handling of cores is objectionable as there is great danger of injuring them, and the molding of the cores in two-part molds having the parting face intersecting the longitudinal axes of the cores requires handling, while the operation is slow as only a few cores can be made at a time. The handling is entirely obviated by my invention and the rapidity of manufacture is greatly increased, for a large number of cores can be made at one time and all simultaneously stripped or removed from the molds, without coming in contact with the hands of the workman.

From the foregoing description it will be manifest that by means of my novel apparatus I am enabled to make the cores absolutely circular in cross section, without any side fins. Where cores are made by the use of split or separable boxes it is impossible to prevent the formation of side fins on the cores, along the parting faces of the box parts. Herein, where the wall of each core-mold is continuous from one end of the core to the other there is nothing which can produce a fin and the cores are perfectly round and absolutely smooth as a consequence.

Having fully described my invention, what

I claim as new and desire to secure by Letters Patent is:—

1. In apparatus of the class described, a core-box having a group of open-ended core-molds, laterally extended supports on opposite sides of the box, and an external rib on the box to sustain a vibrator.

2. A two-part core-box comprising a box proper having a series of open-ended molds each comprising an elongated body portion having the same cross-section throughout and a tapered end, a removable top part having tapered openings to register with the larger ends of the molds and thereby complete the molds for double-tapered cores, and stops rigidly connected with the box and having their faces in a plane parallel to the top of the box and at a distance therefrom equal to the thickness of the removable top part.

3. In apparatus of the class described, a box having a series of open-ended core-molds tapered at one end, a top-plate having tapered openings, to form the opposite tapered ends of the core-molds when the plate is laid upon the top of the box, laterally extended wings on the box near its top, and stops on said wings having their faces in a plane parallel to the top of the box and at a distance therefrom equal to the thickness of the top-plate, to sustain the box when reversed after the top-plate is removed.

4. In apparatus of the class described, a metallic box having a series of open-ended core-molds with cylindrical bodies and tapered at one end, a removable top-plate having tapered openings to register with the larger ends of the mold-bodies and form tapering ends thereat, and stops rigidly connected with the box and having their faces in a plane parallel to the top of the box and at a distance therefrom equal to the thickness of the top-plate.

5. In apparatus of the class described, a metallic box having a series of open-ended core-molds with cylindrical bodies and tapered at one end, a removable top-plate having tapered openings to register with the larger ends of the mold-bodies and form tapering ends thereat, and stops rigidly connected with the box and having their faces in a plane parallel to the top of the box and at a distance therefrom equal to the thickness of the top-plate, two of the stops diagonally opposite having positioning pins, and a bottom-board having sockets to receive the pins when the top-plate is removed and the box is reversed, the bottom-board supporting the projecting ends of the cores while the stops rest upon the board and sustain the box.

In testimony whereof, I have signed my name to this specification, in the presence of two subscribing witnesses.

HOWARD W. BRACKEN.

Witnesses:
ALEXANDER P. DAVIS,
EDWARD DANA OSGOOD.